(12) United States Patent
Eisen et al.

(10) Patent No.: US 6,590,003 B2
(45) Date of Patent: Jul. 8, 2003

(54) METHOD FOR PRODUCING SOFT TO SEMI-RIGID POLYURETHANE INTEGRAL FOAMED MATERIALS

(75) Inventors: Norbert Eisen, Köln (DE); Daniel Seidlitz, Rösrath (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 10/149,036

(22) PCT Filed: Dec. 4, 2000

(86) PCT No.: PCT/EP00/12157

§ 371 (c)(1), (2), (4) Date: Jun. 6, 2002

(87) PCT Pub. No.: WO01/44352

PCT Pub. Date: Jun. 21, 2001

(65) Prior Publication Data

US 2003/0050351 A1 Mar. 13, 2003

(30) Foreign Application Priority Data

Dec. 16, 1999 (DE) .......................... 199 60 779
Jun. 7, 2000 (DE) .......................... 100 28 266

(51) Int. Cl.$^7$ .................................. C08J 9/34
(52) U.S. Cl. .................. 521/51; 521/130; 521/131; 521/163; 521/170; 521/174
(58) Field of Search .................. 521/51, 130, 131, 521/163, 170, 174

(56) References Cited

U.S. PATENT DOCUMENTS

| | | | | | |
|---|---|---|---|---|---|
| 5,130,345 A | * | 7/1992 | Li et al. | ...................... | 521/131 |
| 5,496,866 A | | 3/1996 | Sommerfeld et al. | ....... | 521/131 |
| 5,496,867 A | | 3/1996 | Sommerfeld et al. | ....... | 521/131 |
| 5,646,196 A | | 7/1997 | Sommerfeld et al. | ....... | 521/131 |
| 5,906,999 A | | 5/1999 | Valoppi et al. | ............... | 521/51 |
| 6,080,799 A | * | 6/2000 | Kruecke et al. | ............ | 521/131 |
| 6,380,275 B1 | | 4/2002 | Kruecke | ...................... | 521/131 |
| 6,451,867 B1 | * | 9/2002 | Bogdan et al. | ............. | 521/131 |

FOREIGN PATENT DOCUMENTS

| | | |
|---|---|---|
| CA | 2000019 | 11/1998 |
| DE | 197 25 360 | 6/1998 |
| EP | 0 765 901 | 4/1997 |
| EP | 0 927 738 | 7/1999 |

OTHER PUBLICATIONS

*Patent Abstracts of Japan, vol. 015, No. 227 (C–0839), Jun. 10, 1991 & JP 03 068619 A (Asahi Glass Co Ltd), Mar. 25, 1991.

* cited by examiner

Primary Examiner—John M. Cooney, Jr.
(74) Attorney, Agent, or Firm—Joseph C. Gil; Lyndanne M. Whalen

(57) ABSTRACT

The invention provides a process for the production of flexible to semi-rigid polyurethane shaped articles with a compacted edge zone of given hardness and a significantly more flexible cell core, so-called integral foams, in which non-combustible mixtures of fluoroalkanes which comprise 1,1,1,3,3-pentafluorobutane (R 365mfc) are employed as physical blowing agents.

12 Claims, No Drawings

METHOD FOR PRODUCING SOFT TO SEMI-RIGID POLYURETHANE INTEGRAL FOAMED MATERIALS

BACKGROUND OF INVENTION

The invention relates to a process for the production of flexible to semi-rigid polyurethane shaped articles with a compacted edge zone of given hardness and a significantly more flexible cell core, so-called integral foams, in which non-combustible mixtures of fluoroalkanes which comprise 1,1,1,3,3-pentafluorobutane (R 365mfc) are employed as physical blowing agents.

To build up a compacted edge zone with a cellular internal structure of flexible to semi-rigid polyurethane mouldings, monofluorotrichloromethane (R 11) was used almost exclusively as the blowing agent until the ozone-damaging properties were known. Since the ozone-damaging properties of chlorinated hydrocarbons has become known, there has been no lack of attempts to employ other types of blowing agents for the production of cellular polyurethanes.

EP-A 364 854 thus describes a process for the production of shaped articles with a compacted edge zone and a cellular core, preferably shoe soles, from starting substances which are known per se but using low-boiling aliphatic and/or cycloaliphatic hydrocarbons having 4 to 8 carbon atoms in the molecule. However, a disadvantage of these blowing gases is their combustibility.

EP-A 381 986 discloses the use of $C_3$–$C_5$-fluoroalkanes as blowing agents in the production of polyurethane foams, and U.S. Pat. No. 5,906,999 discloses the production of flexible integral foams using 1,1,1,3,3-pentafluoropropane (R 245fa). However, it has been found that when integral foams are produced using these blowing agents, foams with an unsatisfactory integral structure are obtained.

SUMMARY OF THE INVENTION

The object of the invention was the development of a process for the production of flexible integral foams with a pronounced integral structure which is equivalent to that of products blown with CFCs or HCFCs.

It has now been found that if certain mixtures of fluorohydrocarbons are used as blowing agents, integral foams which are equivalent in respect of compressive strength and surface hardness to systems blown by R 11 or R 141 b and systems blown by hydrocarbons can be obtained. Furthermore, these mixtures are not combustible, which means a great advantage for their handling and processing.

DETAILED DESCRIPTION OF THE INVENTION

The present invention therefore provides a process for the production of flexible to semi-rigid polyurethane shaped articles with a compacted edge zone and a flexible, cellular core, in which
a) organic and/or modified organic polyisocyanates and/or polyisocyanate prepolymers are reacted with
b) at least one polyol component with an OH number of 20 to 200 and a functionality of 2 to 6, preferably 2 to 3,
c) optionally in combination with a polyol component with an OH number of 201 to 899 and a functionality of 2 to 3, and with
d) at least one chain lengthening component with an OH or amine number of 600 to 1,850 and a functionality of 2 to 4, and with
e) optionally additives, activators and/or stabilizers which are known per se in the presence of water and in the presence of 1,1,1,3,3-pentafluorobutane and blowing agent mixtures comprising at least one further fluoroalkane.

1,1,1,3,3-Pentafluorobutane (R 365mfc) is preferably employed as a mixture with 1,1,1,2-tetrafluoroethane (R 134a) or 1,1,1,3,3-pentafluoropropane (R 245fa). Non-combustible blowing agent mixtures are preferably employed for the process according to the invention. Mixtures of 90 to 95 mol % R 365mfc with 5 to 10 mol % R 134a, for example, are particularly preferred. In another particularly preferred variant of the process according to the invention, mixtures of 40 to 95 mol %, preferably 40 to 60 mol %, and in particular 45 to 55 mol % R 365mfc with 5 to 60 mol %, preferably 40 to 60 mol %, and in particular 45 to 55 mol % R 245fa are employed.

As mentioned above, water is also additionally used as a blowing agent in the process according to the invention. The amount of water additionally incorporated into the polyurethane formulations is conventionally 0.05 to 0.6 parts by wt., preferably 0.1 to 0.4 parts by wt., per 100 parts by wt. of components b) and c) (polyol components). The amount of fluorohydrocarbon mixtures is 0.2 to 10 parts by wt., preferably 0.5 to 8 parts by wt., per 100 parts by wt. of components b), c), d) and e) or b) and d) or b), c) and d) or b), d) and e), depending on the particular composition of the reaction products.

Possible organic polyisocyanates a) are the aliphatic, cycloaliphatic, araliphatic and preferably aromatic polyfunctional isocyanates known per se, such as are mentioned, for example, in EP-A 364 854. The toluylene-diisocyanates and the diphenylmethane-diisocyanates, modification products thereof or their corresponding prepolymers, which can be modified by urethane, urea, biuret, allophanate, carbodiimide or uretdione groups, are particularly suitable. Aromatic polyisocyanates which are mentioned in particular are: 4,4-diphenylmethane-diisocyanate, mixtures of 2,4'- and/or 4,4'-diphenylmethane-diisocyanate or crude MDI types and/or 2,4- and/or 2,6-toluylene-diisocyanate and mixtures thereof with one another.

Suitable polyol components b) are those with an OH number of 20 to 200, prefrably 20 to 50, and a functionality of 2 to 6, preferably 2 to 3, corresponding polyether-polyols having a number-average molecular weight of 2,000 to 8,000 and corresponding polyester-polyols having a number-average molecular weight fo 2,000 to 4,000. Polyols with an OH number of 201 to 899 and a functionality of 2 to 3 can optionally be co-used as polyol component c). Polyols such as polyetherpolyols and polyesterpolyols, such as are obtained by addition of alkylene oxides, such as ethylene oxide and propylene oxide, on to polyfunctional starter molecules, such as ethylene glycol, propylene glycol, glycerol, trimethylopropane, sorbitol and/or ethylenediamine, or by condensation of dicarboxylic acids, such as adipic acid, succinic acid, glutaric acid, suberic acid, sebacic acid, maleic acid and phthalic acid, with predominantly bifunctional hydroxy components, such as ethylene glycol, propylene glycol, built up from ethylene oxide and propylene oxide and glycerol, trimethylolpropane, ethyldiamine, propylene glycol, ethylene glycol, sorbitol and mixtures therof as starter molecules, have proved to be particularly suitable. Modified polyols such as are obtained as polyurea dispersions or as PIPA polyols by grafting of polyols with styrene and/or acrylonitrile, can also be used as polyol component b). The polyether and polyester polyols can be employed both individually and as a mixture with one another.

Those chain lengthening agents with an OH or amine number of 600 to 1,850 and a functionality of 2 to 4, in particular 2 to 3, are particularly suitable as component d). Examples which may be mentioned here are glycols, such as ethylene glycol, 1,4-butanediol, glycerol, trimethylolpropane and short-chain alkoxylation products thereof, as well as diethyltoluylenediamine isomers. The crosslinking agent component (chain lengthening component) d) is used in amounts of 3 to 20 wt. %, based on the sum of the amounts of polyol component b) and c) (if present), ethylene glycol and 1,4-butanediol being preferred as diols and diethyltoluylenediamine isomers being preferred as diamines.

Additives, activators and/or stabilizers known in principle to the expert can be employed as component e). These are, for example, compounds containing tertiary amino groups, such as 1,4-diazo[2,2,2]-bicyclooctane or bis(2-dimethylaminoethyl) ether, organometallic compounds, such as dimethyltin dilaurate or dibutyltin dilaurate, colour pastes, yellowing stabilizers, fillers, flameproofing agents, internal release agents or stabilizers such as are described in EP-A 364 854.

The amounts depend on the particular field of use and can be determined by preliminary experiments.

The production of the shaped articles according to the invention is also known to the expert and does not need to be described in more detail. In this connection, reference is again made to EP-A 364 854.

The flexible to semi-rigid polyurethane foams with an integral structure produced by the process according to the invention as a rule have Shore A hardnesses of between 30 and 90 in the edge zone and compressive strengths of between 30 and 350 kPa at bulk densities of between 150 and 900 kg/m$^3$.

The combination of high surface hardnesses (in Shore A) with low compressive strengths of the shaped articles, which indicates a pronounced integral structure, is particularly advantageous in the integral foams produced by the process according to the invention.

Fields of use for the shaped articles according to the invention are e.g. bicycle saddles, safety valves, interior fittings of motor vehicles (arm rests, head rests, steering wheel sheathing), motorcycle seats, arm rests in the office furniture sector and treatment chairs in the medical sector.

EXAMPLES
Description of the Raw Materials

| Polyols | |
|---|---|
| Polyol 1: | Polyether-polyol with an OH number of 29 and with predominantly primary OH groups, prepared by addition of 80 wt. % propylene oxide and 20 wt. % ethylene oxide on to propylene glycol as the starter molecule. |
| Polyol 2: | Polyether-polyol with an OH number of 28 and with predominantly primary OH groups, prepared by addition of 80 wt. % propylene oxide and 20 wt. % ethylene oxide on to trimethylolpropane as the starter molecule, grafted to the extent of 20% with styrene/acrylonitrile. |
| Polyol 3: | Polyether-polyol with an OH number of 35 and with predominantly primary OH groups, prepared by addition of 87 wt. % propylene oxide and 13 wt. % ethylene oxide on to trimethylolpropane as the starter molecule. |

Polyisocyanate

Polyisocyanate prepolymer with an isocyanate content of 28 wt. %, prepared by reaction of a polyisocyanate mixture of the diphenylmethane series, which has been obtained by phosgenation of an aniline/formaldehyde condensate and has an isocyanate content of 30 wt. %, with 80 wt. % diisocyanatodiphenylmethane, and 20 wt. % homologues with a higher number of rings, with a polyether of OH number 500, prepared by addition of propylene oxide on to propylene glycol as the starter molecule.

| Blowing agents | | | |
|---|---|---|---|
| Abbreviation | Name | Molecular weight | Boiling point [° C.] |
| R134a[1] | 1,1,1,2-tetrafluoroethane | 102 | −26.5 |
| R245fa[1] | 1,1,1,3,3-pentafluoropropane | 134 | 15 |
| R356mffm[1] | 1,1,1,4,4,4-hexafluorobutane | 166 | 24.6 |
| R365mfc | 1,1,1,3,3-pentafluorobutane | 148 | 40 |
| R365mfc/ R134a (93:7)[1] | 1,1,1,3,3-pentafluorobutane/ 1,1,1,2-tetrafluoroethane | 145** | 20 |
| R365mfc/ R245fa (50:50)[1] | 1,1,1,3,3-pentafluorobutane/ 1,1,1,3,3-pentafluoropropane | 141** | 24 |
| R365mfc/ R245fa (95:5)[1] | 1,1,1,3,3-pentafluorobutane/ 1,1,1,3,3-pentafluoropropane | 147.3** | 37 |
| n-pentane | | 72 | 36 |
| i-hexane | | 86 | 61 |

**average molecular weight
[1]has no flash point according to DIN 51755 part 2

Preparation of the Test Specimens

The raw material mixtures described below are introduced in the conventional manner for mechanical processing of polyurethanes into a sheet mould 190×155×20 mm in size heated at 40° C., compacted to 250 kg/m$^3$ and removed from the mould after 10 minutes. The temperature of the raw materials is 25° C.

| Polyol formulation | |
|---|---|
| Polyol 1: | 40.0 pt. by wt. |
| Polyol 2: | 35.0 pt. by wt. |
| Polyol 3: | 30.0 pt. by wt. |
| Ethylene glycol: | 9.0 pt. by wt. |
| Water: | 0.1 pt. by wt. |
| Silicone stabilizer: (SH 205, Witco Surfactants GmbH, D-36396 Steinau) | 0.3 pt. by wt. |
| Activator: (DABCO ® 33 LV, Air Products GmbH, D-45527 Hattingen) | 0.35 pt. by wt. |
| Recipes for test specimens | |
| Polyol formulation A: | 100 pt. by wt. |
| Isocyanate A: | 48 pt. by wt. |
| Blowing agent: | see table 1 |

TABLE 1

Examples 1–8

| Example | Blowing agent | Pt. by wt. | Compressive strength [KPa] | Hardness [Shore A] | Integral structure quotient |
|---|---|---|---|---|---|
| 1 | R 134a | 3.5# | 80 | 42 | 1.90 |
| 3 | R 356mffm | 13.5 | 70 | 41 | 1.71 |
| 2 | R 245fa | 11 | 63 | 50 | 1.26 |
| 4 (inv.) | R 365mfc/R 134a (93:7) | 12 | 45 | 60 | 0.75 |
| 5 (inv.) | R 365mfc/R 245fa (50:50) | 12 | 43 | 60 | 0.71 |
| 6 (inv.) | R 365mfc/R 245fa (95:5) | 12 | 42 | 60 | 0.70 |
| 7* | R 365mfc | 12 | 41 | 60 | 0.68 |
| 8* | n-pentane | 6 | 51 | 60 | 0.85 |
| 9* | i-hexane | 7 | 42 | 59 | 0.71 |

*combustible; (inv.) example according to the invention;
maximum soluble amount of blowing agent in the polyol component The properties profile of integral foams is determined in particular by the surface hardness (measured in Shore A) and the compressive strength. The highest possible surface hardness (high bulk density in the edge region) combined with a compressive strength which is low by comparison with the overall bulk density, is advantageous. The integral structure quotient, a correlation factor of compressive strength and surface hardness, can therefore be used as a dimension for evaluating the integral structure. The lower the value of this correlation factor, the better the integral structure.

This quotient depends greatly on the choice of blowing agent, as the examples show. The correlation factors achieved with blowing agent mixtures according to the invention (examples 4 to 6) are considerably lower than when R 134a, R 245fa or R 356mffm is employed and are comparable to those of systems blown with alkanes. In addition, the blowing agent mixtures are not combustible, in contrast to alkanes or pure R 365mfc.

What is claimed is:

1. A process for the production of flexible to semi-rigid polyurethane shaped articles having a compacted edge zone and a flexible, cellular core comprising reacting in a mold
    a) a polyisocyanate
with
    b) at least one polyol having an OH number of from about 20 to about 200 and a functionality of from about 2 to about 6, and
    c) at least one chain lengthening agent having an OH or amine number of from about 600 to about 1850 and a functionality of from about 2 to about 4
in the presence of
    d) water,
    e) 1,1,1,3,3-pentafluorobutane and
    f) at least one fluoroalkane which is different from e).

2. The process of claim 1 in which the polyisocyanate is an organic polyisocyanate, a modified organic polyisocyanate, a polyisocyanate prepolymer or a combination thereof.

3. The process of claim 1 in which a polyol having an OH number of from about 201 to about 899 and a functionality of from about 2 to about 3 is also a material being reacted.

4. The process of claim 1 in which 1,1,1,2-tetrafluorethane is f).

5. The process of claim 4 in which the 1,1,1,2-tetrafluoroethane content is from about 5 to about 10 mol % of total blowing agent.

6. The process of claim 1 in which 1,1,1,3,3-pentafluoropropane is f).

7. The process of claim 6 in which the 1,1,1,3,3-pentafluoropropane content is from about 5 to about 60 mol % of total blowing agent.

8. The process of claim 1 in which from about 3 to about 20 wt. %, based on total weight of polyol, of c) is used.

9. The process of claim 1 in which a glycol is also a material being reacted.

10. The process of claim 1 in which isomers of diethyltoluene diamine are used as c).

11. A shaped article having a bulk density of from about 150 to about 900 kg/m$^3$ produced by the process of claim 1.

12. A shaped article produced by the process of claim 11 which is in the form of a bicycle saddle, a safety valve, an arm rest, a head rest, a steering wheel sheathing, a motorcycle seat or a treatment chair.

* * * * *